United States Patent
Brydges et al.

(10) Patent No.: US 6,564,714 B2
(45) Date of Patent: May 20, 2003

(54) SPECTRAL COLOR CONTROL METHOD

(75) Inventors: David Brydges, San Francisco, CA (US); Erik Tobiason, Scotts Valley, CA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/916,726

(22) Filed: Jul. 26, 2001

(65) Prior Publication Data

US 2002/0104457 A1 Aug. 8, 2002

Related U.S. Application Data

(60) Provisional application No. 60/258,536, filed on Dec. 27, 2000, and provisional application No. 60/251,699, filed on Dec. 6, 2000.

(51) Int. Cl.[7] .................................................. B41M 1/54
(52) U.S. Cl. ..................................................... 101/484
(58) Field of Search ............................... 101/484, 483, 101/211, 171; 347/262

(56) References Cited

U.S. PATENT DOCUMENTS

| | | |
|---|---|---|
| 4,439,038 A | 3/1984 | Mactaggart |
| 4,660,159 A | 4/1987 | Ott |
| 4,852,485 A | 8/1989 | Brunner |
| 4,975,862 A | 12/1990 | Keller et al. |
| 5,031,534 A | 7/1991 | Brunner |
| 5,068,810 A | 11/1991 | Ott |
| 5,182,721 A | 1/1993 | Kipphan et al. |
| 5,357,448 A | 10/1994 | Stanford |
| 5,551,342 A | 9/1996 | Fuchs et al. |
| 6,024,018 A | 2/2000 | Darel et al. |
| 6,041,708 A | 3/2000 | Kipphan et al. |

FOREIGN PATENT DOCUMENTS

DE     196 17 016     4/1996

OTHER PUBLICATIONS

"Notification of Transmittal of the International Search Report or the Declaration" in PCT/US01/47253, mailed Aug. 14, 2002, 6 pages in length.

Primary Examiner—Raquel Yvette Gordon
(74) Attorney, Agent, or Firm—Stallman & Pollock LLP (57) ABSTRACT

A method for controlling color on press during printing utilizing spectral measurements is disclosed. When a color-difference is exceeded the measured spectral reflectance values of a test area are compared with the corresponding target reflectance values from which a spectral reflectance difference is established. A linear equation is used to relate the spectral reflectance difference to solid ink density or ink layer thickness differences for ink regulation utilizing an on-line empirically established correction matrix such that the spectral reflectance difference is minimized. The control method is applicable to both process and non-process colors.

66 Claims, 4 Drawing Sheets

SPECTRAL COLOR CONTROL METHOD

RELATED APPLICATION

This application claims the benefit of Provisional Patent Application No. 60/258,536, filed Dec. 27, 2000, titled "Spectral Color Control Method", which is hereby incorporated by reference in its entirety.

This application also claims the benefit of Provisional Patent Application No. 60/251,699, filed Dec. 6, 2000, titled "Method and Apparatus for Controlling Color of a Printing Press Based Upon Colorimetric Density Differences", which is hereby incorporated by reference in its entirety.

BACKGROUND OF THE INVENTION

1. Field of the Invention

The present invention relates to on-line color control in printing presses for both process and non-process (PMS or special) colors and, in particular, to the direct utilization of spectral measurements in combination with linear equations to determine the ink flow corrections necessary to maintain accurate color on press.

2. Discussion of the Related Art

Accurate color control of printing presses requires that color deviations between an established color target and a corresponding test area in subsequently printed sheets be kept within established color tolerances. When the color tolerances are exceeded, inking adjustments in the form of solid ink density or ink layer thickness corrections are used in order to reduce the color deviation such that the color-difference is within tolerance.

During printing, it is common practice for a press operator to visually monitor the printed images and adjust the flow of ink into the press until a visual match is achieved. A pre-press proof or previously printed "Color OK" sheet is typically used as the aim or target condition. Due to the inherent variation in observers color vision, both within individuals over time and between different individuals, this procedure is subject to large variability and is also time consuming. Instrumental color control offers an alternative for process color control that is more repeatable, accurate and efficient.

Within the graphic arts industry, densitometry has been the main measurement method for measuring and controlling the primary inks and related attributes in process color printing. Although the densitometer is suited for measurements pertaining to the relative strength of a process color solid ink film, the densitometer is not capable of describing the color of an object in a manner that relates to the visual sensation of color. Color control applied to the control of a printing press has as one of it's main purposes the task of maintaining a visual match between an established color target location and that same location in subsequently printed sheets such that no visually disturbing color differences appear throughout the duration of the press run. Therefore, a color measurement instrument that is capable of describing the color of objects in approximate visual terms is required. Instruments that are capable of this requirement include calorimeters and spectrophotometers. Spectrophotometers, furthermore, have the advantage that they can report both densitometric and colorimetric data calculated according to standard procedures.

Measurements for color control are most commonly made on color control bars that contain a variety of test elements, which provide information on print quality attributes. Although color control based on color bar measurements provides a high level of print quality, it is alternatively possible to attain a high level of print quality by measuring within the image. In such cases, color control based on intra-image measurements, either in combination with a color bar or without, can provide the necessary level of print quality.

Control of any system requires knowledge of the relationship between the input variable(s) and the output variable(s). In printing, although there are many options for input variables, the main press control or output variable influencing the visual impression of the printed image is the inking system, which modulates the flow of ink into the press. By varying the volume of ink flowing into the press, the thickness of the ink layer deposited onto the paper will vary, thereby influencing the color of the print.

Although, multi-color halftone image reproduction is in general a non-linear process, under certain conditions it is possible to use linear equations to model the process by restricting the range of the transformation to a sub-region of the color gamut. Within each sub-region, which has the target color as its origin, a set of "localized" equations can be used. The region over which the localized transformations will be linear is dependent on the target color location and the input and output variables used to represent the differences between the test and target areas in the transformation.

Methods for performing color control on printing presses using a spectrophotometer are described in U.S. Pat. Nos. 4,975,862, 5,182,721 and 6,041,708. These patents however, describe methods for controlling the printing press with colorimetric coordinates, which are obtained from spectral reflectance data, rather than using the spectral reflectance data directly.

Several aspects of the aforementioned U.S. patents can be improved upon for use in a color control system. Colorimetric models provide less accurate control as compared to spectral models primarily in situations where the spectral reflectance difference between two ink settings cannot be described by a single constant or multiplication factor. Additionally, off-line methods of calculating the parameters of the matrix relating solid ink density or ink layer thickness differences to spectral reflectance differences are not accurate enough for use in a commercial color control system. Such methods only represent the state of the system at one point in time. Dynamic methods of calculating the matrix on-line in real-time during the press run would greatly improve the effectiveness and accuracy of the control method.

SUMMARY

The present invention provides a method of color control for printing presses through direct use of spectral reflectance data. Spectral reflectance differences between a target and test area are determined and used to calculate solid ink density or ink layer thickness corrections for use in controlling the printing press. The method converts a spectral reflectance difference directly into either solid ink density or ink layer thickness corrections through the use of a linear equation employing an empirically derived transformation matrix, which is calculated on-line. The method is applicable to the control of both process and non-process (PMS or special) colors.

A better understanding of the features and advantages of the present invention will be obtained by reference to the following detailed description and accompanying drawings that set forth an illustrative embodiment in which the principles of the invention are utilized.

DETAILED DESCRIPTION

The present invention utilizes data obtained from spectral measurements on either color bar swatches, image areas within the printed product, or a combination of both color bar swatches and image areas within the product for color control.

Figure 1A:
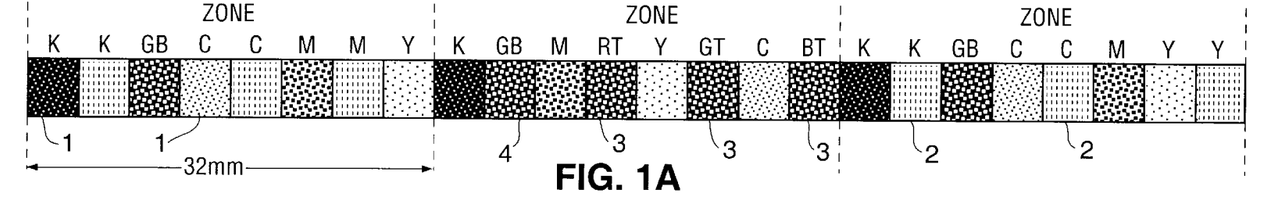
FIG. 1a illustrates a typical test swatch arrangement to form a color bar.
Figure 2:
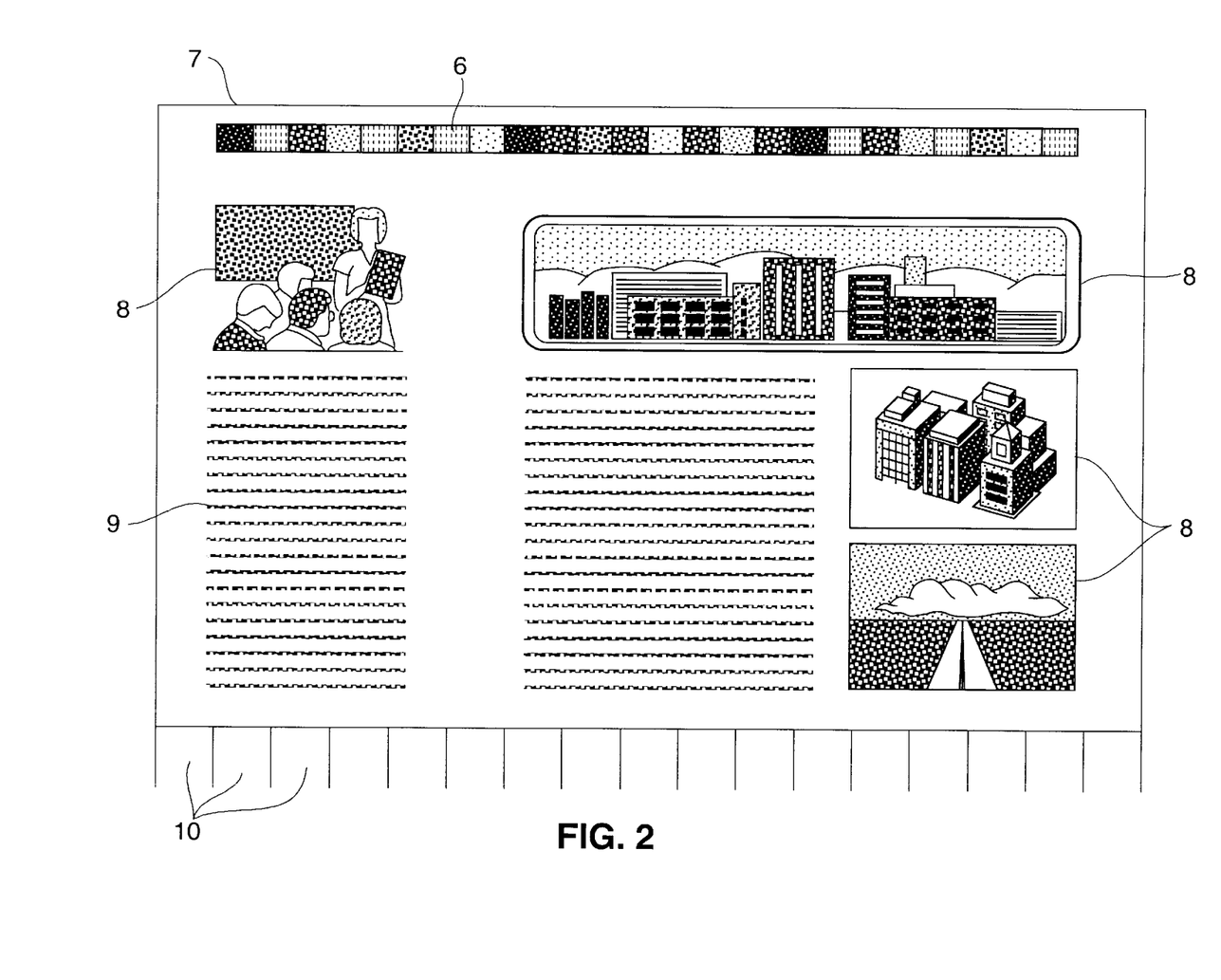
FIG. 2 illustrates ink adjustment in neighboring zones for color control.

Referring to FIG. 1, a color bar used for process control is composed of test elements arranged in a row. The color bar, which is printed perpendicular to the press direction, is most often located at either the top, the middle or the bottom of the printed signature in the trim or fold area, as shown in FIG. 2. Test swatches for measuring print quality attributes are well known in the field and described in the literature (see, for example, "Introduction to Color Bars: A User's Guide to Color Bar Application", Graphic Communications Association, 1992).

Test swatches commonly found in color bars include solids (100% area coverage) (1), halftone tints of various area coverage for each of the primary inks (black, cyan, magenta and yellow) (2) and two and three-color overprints of the primary chromatic inks (cyan, magenta and yellow) (3).

Figure 1B:
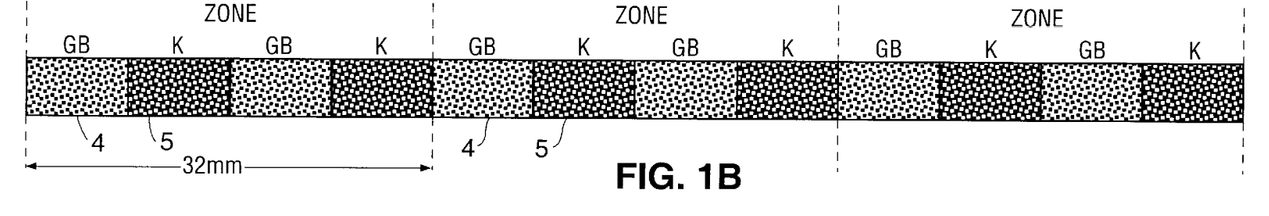
FIG. 1b illustrates an alternative arrangement of a color bar
Figure 1C:
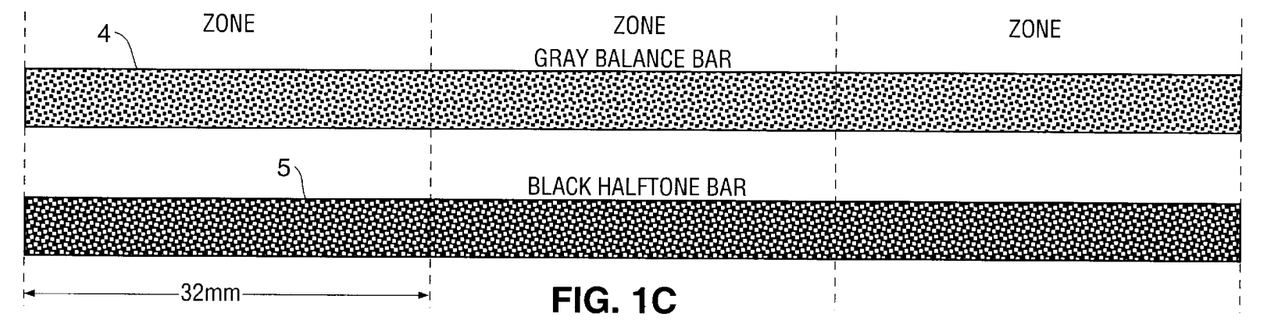
FIG. 1c illustrates an alternative arrangement of a color bar

In situations such as newspaper printing where no trim area exists, the color bar is often designed into the page layout in such a manner that it isn't visually disturbing to the reader. Referring to FIGS. 1b & 1c, respectively, in such situations, it is common to print either a single color bar composed of alternating swatches of three-color neutral (4) and black halftone tints (5) or two color bars with one bar being entirely composed of a three-color neutral halftone tint (4) and the other of a black halftone tint (5). Other color bar variations on this theme are also possible. It should be noted that, under proper printing conditions, the three-color neutral halftone swatches and black halftone tint swatches illustrated in FIGS. 1b & 1c should appear visually the same in hue and lightness. The lightness differences that exist in the figures are solely for clarification of the concept.

Control of the inking in most printing presses is carried out on a zone by zone basis where each zone corresponds to a width of, for example, 32 mm, as shown in FIG. 1. Within each zone (10), an ink key, controlled by a servo motor, or similar means, in an automated ink control system, is used to adjust the amount of ink flowing into this region of the press, which will in turn influence the color of the swatches located within the specific zone and, to a varying degree, the neighboring zones in FIG. 2. In this manner, the inking can be adjusted to produce the desired colors of the swatches. It is, therefore, important for accurate color control both to select the test swatches and/or image areas that are very sensitive to variations in the important print quality attributes and to position either the control swatches appropriately throughout the color bar and/or image areas across the print area.

In order to determine the color of a test swatch or image area, a measurement instrument for detecting the light reflected from a measurement location is necessary. The measurement instrument is preferably a spectrophotometer. The preferred and well-known method for collecting and analyzing light with a spectrophotometer is the use of a spectral grating and an array of sensors with computer analysis. The output is a set of spectral reflectance values that describe the relative light reflecting characteristics of an object over the visible spectrum at some small constant width wavelength interval. The reflectance values are obtained by calculating the spectral reflectance factor, which is a ratio of the amount of light reflected from the sample relative to that of a standard reference material similarly illuminated, wavelength by wavelength, across the visible spectrum. Spectrophotometers have the added advantage that the spectral reflectance values can be converted to both colorimetric and densitometric representations according to standard calculations. Throughout this document, when the term "density" is used, it is used to refer to densities calculated according to standard practice as documented in, for example, American National Standard for Photography (Sensitometry)—Density Measurements—Spectral Conditions. ANSI/ISO 5/3-1984, ANSI PH2.18-1985, New York: American National Standards Institute, 1985. The term colorimetric is used to refer to colorimetric coordinates calculated according to standard practice as documented in, CGATS.5-1993 Graphic technology—Spectral measurement and colorimetric computation for graphic arts images.

Color control methods using measurements on solid (100% area coverage) swatches are well documented in the literature. Although these methods are a direct means of control, as solid ink density (SID) is the only variable which can be adjusted directly in real time, these methods have limitations because several important attributes related to image quality, such as tone value increase (dot gain) and trapping, are not taken into consideration and have an impact on the image reproduction in addition to changes in solid ink density. As a result, when performing control of color based on solid ink density alone, the appearance of the object being printed may deviate significantly from the established "Color OK", although the solid ink density measurements indicate otherwise. It is, therefore, important to select the swatches and/or image areas that either have maximum sensitivity to changes in the important print quality attributes previously mentioned or are a visually significant aspect of the print. Additionally, a minimum number of swatches should be used in order to reduce the number of color measurements necessary for control purposes.

Figure 3:
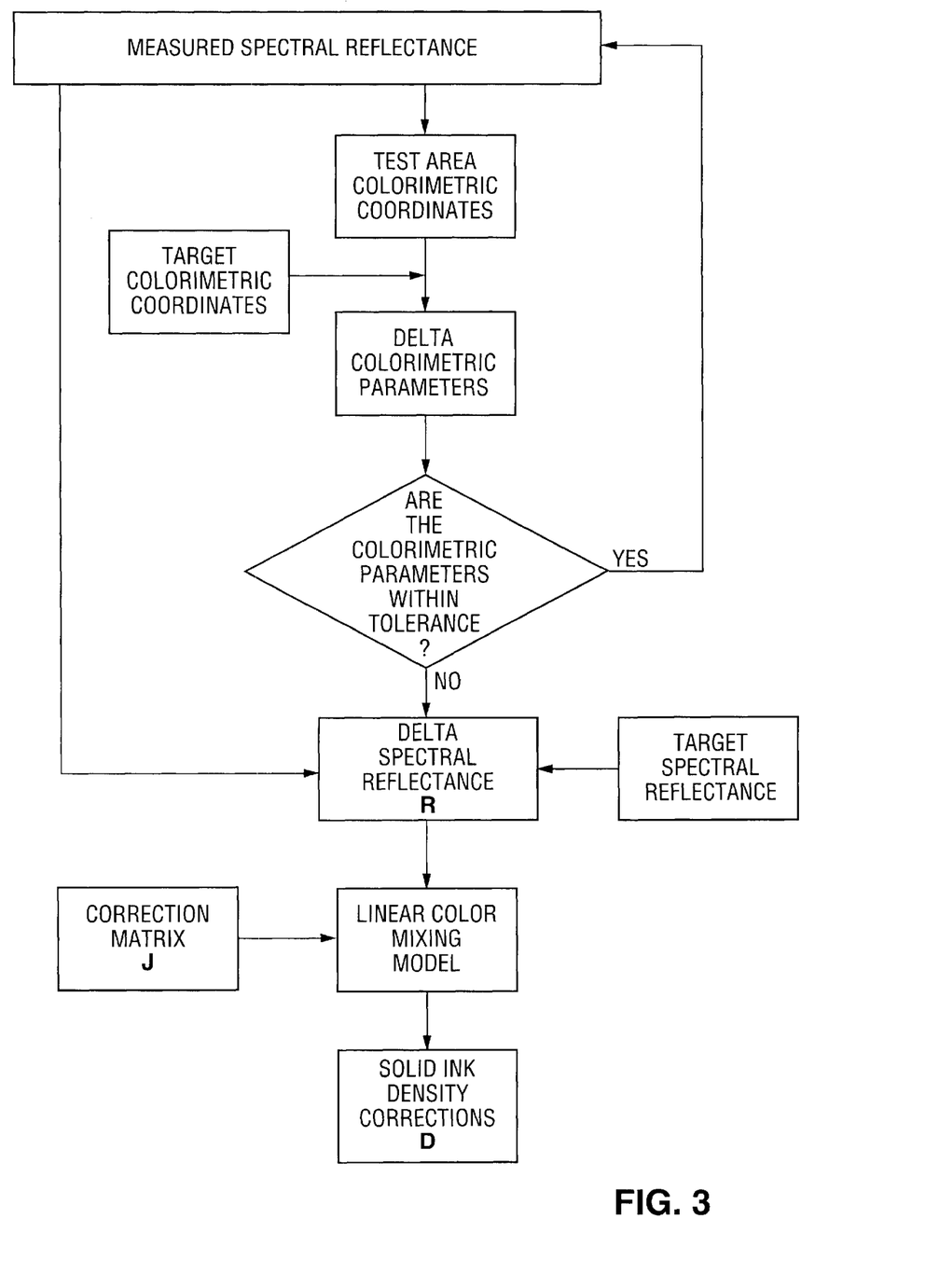
FIG. 3 is a flow chart illustrating a color control method in accordance with the present invention.

Referring to the FIG. 3 flow chart, in accordance with the present invention, the spectral reflectance of a test swatch or image area is measured (100) using a spectrophotometer. The spectral reflectance values are converted to color coordinates/color parameters (102) in one of the CIE recommended uniform color spaces (CIELAB, CIELUV) which have as their primary advantage the ability to quantify color in approximate visual terms. Colorimetric coordinates are calculated from spectral reflectance values according to standard calculations as previously described. The colorimetric coordinates of the test swatch or image area are compared (104) to those of a corresponding target swatch or image area represented in the same color space to obtain color parameter difference values. The target colorimetric values, which are calculated from the target spectral reflectance values, may be obtained in several ways, including measuring on a previously printed sheet termed a "Color OK" sheet. Alternatively target values may be set manually by the operator through a variety of means including the use of a handheld spectrophotometer, or automatically by systems in the pre-production, or pre-press, process. The color parameter differences can furthermore be used to calculate a total color-difference using one of the well-known color-difference equations such as $\Delta E^*_{ab}$, $\Delta E^*_{uv}$, $\Delta E^*_{94}$, etc. To determine whether an inking correction is required, the color parameter differences are compared (106) to established color tolerances for the target in question. The color tolerances for a target swatch or image area are established prior to printing and may be based on for example industry standards or printing plant specific. If the colorimetric parameter differences are out of tolerance a correction is necessary. If a correction is necessary, the use of colorimetric coordinates is abandoned and spectral reflectance data is used for calculating the inking corrections. This is accomplished by comparing the spectral reflectance values of the test area (100) with the corresponding target spectral reflectance values to obtain spectral reflectance difference values (108). The spectral differences are then converted directly to solid ink density corrections (110) using a linear matrix equation (Equation 1).

$$\begin{bmatrix} \Delta D_C \\ \Delta D_M \\ \Delta D_Y \end{bmatrix} = \begin{bmatrix} a_{11} & a_{12} & a_{13} & \ldots & \ldots & a_{1m} \\ a_{21} & a_{22} & a_{23} & \ldots & \ldots & a_{2m} \\ a_{31} & a_{32} & a_{33} & \ldots & \ldots & a_{3m} \end{bmatrix} \begin{bmatrix} \Delta R(\lambda)_1 \\ \Delta R(\lambda)_2 \\ \vdots \\ \Delta R(\lambda)_m \end{bmatrix} \quad \text{Equation 1}$$

$$D = J' \cdot R$$

where R is a spectral reflectance difference vector containing the spectral reflectance differences $\Delta R(\lambda)$, D is a solid ink density difference or correction vector containing the calculated cyan, magenta and yellow solid ink density differences $\Delta Dc$, $\Delta Dm$ and $\Delta Dy$ respectively measured through their primary color filters and J' is a 3×m "correction" matrix (112) relating the two vectors where m is the number of wavelength intervals Although most spectrophotometers report approximately 31 spectral reflectance values to describe the spectral reflectance of an object, in many cases a reflectance spectrum can be represented with fewer spectral reflectance values with the specific selection of the wavelengths being dependent on the spectrum or spectra being considered. For control of the chromatic single color solids, wavelengths in the region of maximum absorption would naturally be of interest. Reducing the number of spectral reflectance values used in the calculations will both increase the speed of computation and reduce the number of measurements necessary for estimating the coefficients of the J matrix.

Figure 4:
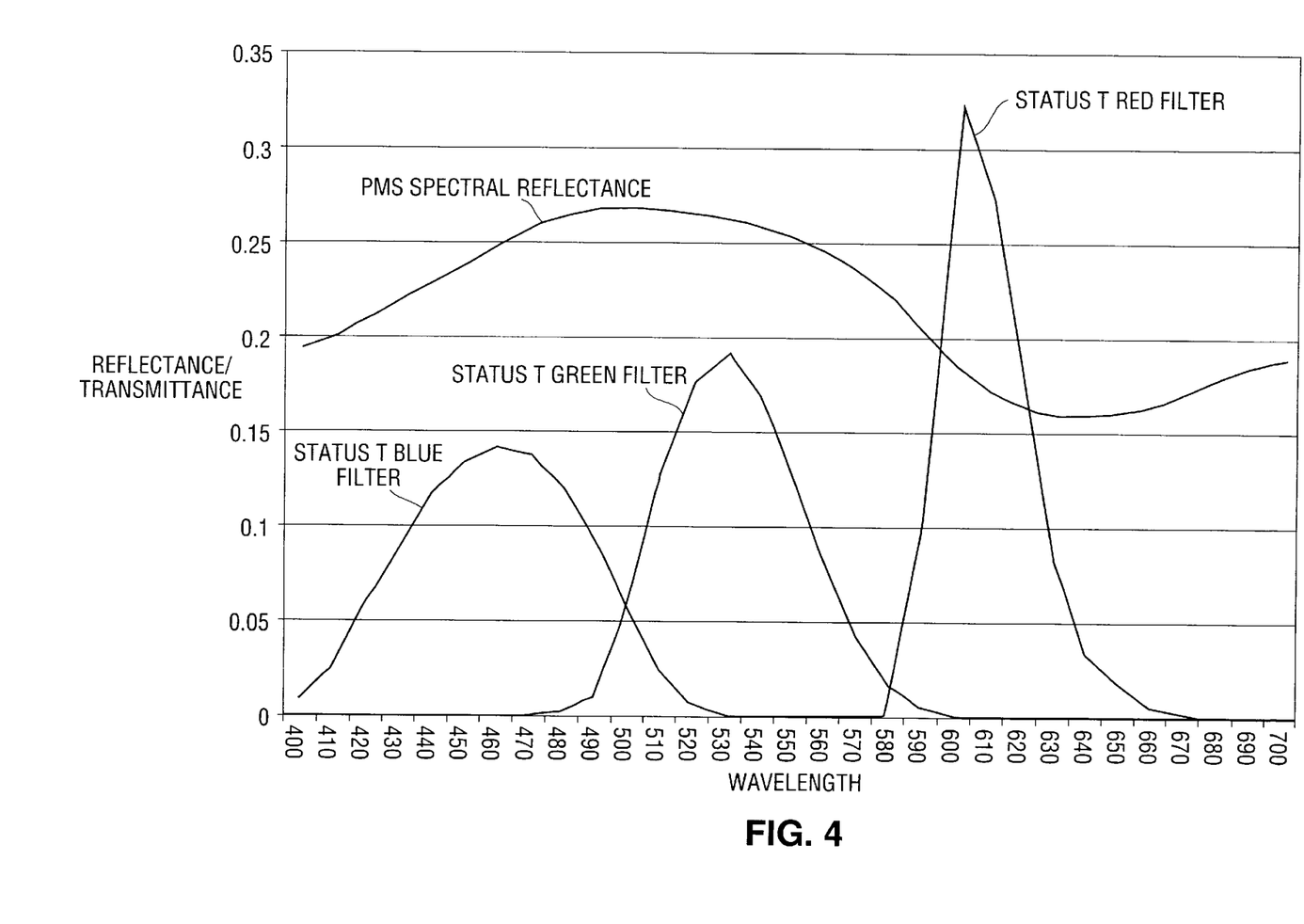
FIG. 4 illustrates the advantage of using ink layer thickness corrections in combination with spectral reflectance measurements for controlling non-process colors.

It is also possible using the form of Equation 1 to calculate ink layer thickness corrections instead of solid ink density corrections directly from spectral reflectance differences Such a transformation has distinct advantages for the control of non-process colors, process colors based on intra-image measurements only and in situations, such as in newspaper printing, where only three-color neutral and black halftones test elements are available for control measurements. Referring to FIG. 4, for the control of non-process colors the advantage of this approach lies mainly in the fact that, for many non-process colors, the region of maximum absorptance does not align very well with the region of maximum transmittance for either the Status T and Status E filters commonly used in the graphic arts. This lack of alignment results in a densitometric value that has reduced sensitivity to changes in ink layer thickness Referring to FIG. 4, this can be seen where the blue, green and red Status T filters are plotted along with the reflectance spectrum of a non-process ink.

Referring back to the FIG. 3 flow chart, the correction matrix (112) contains the partial derivatives of the dependent variable with respect to the independent variable. The elements of the correction matrix are highly dependent on several factors that include the printing conditions (ink, paper, press, etc.), and area coverage of the primary inks. As a result, a correction matrix is required for each test area to accommodate the aforementioned situation. Additionally, due to changes in the operating conditions of the press throughout a press run, which can have an influence on the print characteristics, the transformation matrix determined initially will require updating until the operating conditions have stabilized.

The correction matrix presented in Equation 1 relates spectral reflectance differences to the corresponding differences in solid ink density. The correction matrix could also be used to relate spectral reflectance differences to ink layer thickness differences. The elements of the matrix below are the partial derivatives of solid ink density with respect to spectral reflectance.

$$J' = \begin{bmatrix} \dfrac{\partial D_C}{\partial R(\lambda)_1} & \dfrac{\partial D_C}{\partial R(\lambda)_2} & \dfrac{\partial D_C}{\partial R(\lambda)_3} & \ldots & \ldots & \dfrac{\partial D_C}{\partial R(\lambda)_m} \\ \dfrac{\partial Dm}{\partial R(\lambda)_1} & \dfrac{\partial Dm}{\partial R(\lambda)_2} & \dfrac{\partial Dm}{\partial R(\lambda)_3} & \ldots & \ldots & \dfrac{\partial Dm}{\partial R(\lambda)_m} \\ \dfrac{\partial Dy}{\partial R(\lambda)_1} & \dfrac{\partial Dy}{\partial R(\lambda)_2} & \dfrac{\partial Dy}{\partial R(\lambda)_3} & \ldots & \ldots & \dfrac{\partial Dy}{\partial R(\lambda)_m} \end{bmatrix}$$

The elements in row one describe the rate of change in the cyan solid ink density value of a specific test element for a unit change in the reflectance at a given wavelength. The remaining two rows describe the same relationship for density differences in magenta and yellow, respectively. One method of obtaining these elements would be to adjust the cyan, magenta and yellow solid ink density values independently and measure the resulting change in the spectral reflectance values. The limitation of this approach is that it would require specific solid ink density changes to be made while the press is printing that may be contradictory to those necessary for control at that point in time, thereby reducing the efficiency of the control method. The proposed method, which would overcome this limitation, estimates the elements of the correction matrix using the method of least-squares. The least-square estimates of the elements of the correction matrix are calculated according to Equation 2.

$$J = (X'X)^{-1} \cdot X'Y \quad \text{Equation 2}$$

where X is an n×m matrix of values of the independent variable, Y is an n×3 matrix of values of the dependent variable and n is the number of samples used in the estimation. The elements of the correction matrix can be determined from the solid ink density or ink layer thickness values and the spectral reflectance differences available during the initial make-ready process. In this manner, no additional solid ink density or ink layer thickness changes are necessary and the estimated elements of the matrix may further account for any secondary effects which may occur when more than one ink is adjusted simultaneously.

The least-squares estimates of the correction matrix elements are determined in the same manner as presented in Equation 2 with the independent variable being spectral reflectance differences and the dependent variable being either solid ink density or ink layer thickness differences. Implementation of the calculated corrections will minimize the stated color-difference.

It should be understood that various alternatives to the embodiments of the invention described above may be employed in practicing the invention. Thus, it is intended that the following claims define the scope of the invention and that methods and structures within the scope of these claims and their equivalents be covered thereby.

What is claimed is:

1. A method of controlling color on a printed sheet at a printing press, the method comprising:
   measuring spectral reflectance values of a test area formed on the printed sheet;
   comparing measured color values associated with the printed sheet with target color values to determine a color value difference;
   determining if the color value difference is within a tolerance;
   if the color value difference is not within the tolerance, converting the measured spectral reflectance values directly to a correction value; and
   controlling ink flow at the printing press using the correction value.

2. A method of controlling color on a printed sheet at a printing press, the method comprising:
   measuring spectral reflectance values of a test area formed on the printed sheet;
   comparing the measured spectral reflectance values with target spectral reflectance values to determine spectral reflectance difference values;
   converting the spectral reflectance difference values directly to a correction value; and
   regulating ink flow to the printing press using the correction value.

3. The method of claim 2, and further comprising:
   prior to the converting step, determining whether the spectral reflectance difference values are within a tolerance, and performing the converting step only if the spectral reflectance difference values are not within the tolerance.

4. The method of claim 2, and wherein
   the converting step comprises utilizing a linear equation to convert the spectral reflectance difference values to the correction value.

5. The method of claim 4, and wherein
   the converting step comprises dynamically determining and applying a correction matrix to the linear equation to produce the correction value.

6. The method of claim 5, and wherein
   elements of the correction matrix are determined using the method of least-squares.

7. The method of claim 2, and wherein the printed sheet has an image printed thereon, and the test area is within the image.

8. The method of claim 2, and wherein the printed sheet has an image printed thereon, and the test area is outside the image.

9. The method of claim 8, and wherein the test area comprises a color bar.

10. The method of claim 2, and wherein the printed sheet has an image printed thereon, and the test area includes a first area that is within the image and a second area that is outside the image.

11. The method of claim 10, and wherein the second area comprises a color bar.

12. The method of claim 2, and wherein the spectral reflectance difference values are converted directly to solid ink density correction values.

13. The method of claim 2, and wherein the spectral reflectance difference values are converted directly to ink layer thickness correction values.

14. The method of claim 2, and wherein the test area comprises a color bar having test swatches that include solids.

15. The method of claim 14, and wherein the solids include a solid of a special color ink.

16. The method of claim 2, and wherein the test area comprises a color bar having test swatches that include halftone tints.

17. The method of claim 2, and wherein the test area comprises a color bar having test swatches that include overprint combinations of the printing inks.

18. The method of claim 2, and wherein the test area comprises a color bar having alternating test swatches of three color neutral and black halftone tints.

19. The method of claim 2, and wherein the test area comprises first and second color bars, the first color bar being entirely composed of a three-color neutral halftone tint, the second color bar having a black halftone tint.

20. The method of claim 2, and wherein the step of measuring is performed utilizing a spectrophotometer.

21. The method of claim 20, and wherein the spectrophotometer uses a spectral grating and an array of sensors with computer analysis.

22. The method of claim 20, and wherein the spectrophotometer generates on output that is a set of spectral reflectance values that describe the relative light reflecting characteristics of the test area over the visible spectrum at a predefined constant width wavelength interval.

23. The method of claim 22, and wherein the spectral reflectance values are obtained by calculating a spectral reflectance factor, wavelength by wavelength, across the visible spectrum.

24. The method of claim 20, and wherein the spectral reflectance values are converted to densitometric representations.

25. The method of claim 24, and wherein the densitometric representations are calculated from spectral reflectance values according to ANSI/ISO standard responses and methods.

26. The method of claim 2, and wherein the target values are manually set by a printing press operator.

27. The method of claim 2, and wherein the target values are obtained from a "Color OK" sheet.

28. The method of claim 2, and wherein the target values are obtained from pre-press systems.

29. The method of claim 2, and wherein the step of converting the spectral reflectance difference values directly to correction values comprises using a linear matrix equation.

30. The method of claim 29, and wherein the linear matrix equation comprises:

$$\begin{bmatrix} \Delta C_C \\ \Delta C_M \\ \Delta C_Y \end{bmatrix} = \begin{bmatrix} a_{11} & a_{12} & a_{13} & \ldots & \ldots & a_{1m} \\ a_{21} & a_{22} & a_{23} & \ldots & \ldots & a_{2m} \\ a_{31} & a_{32} & a_{33} & \ldots & \ldots & a_{3m} \end{bmatrix} \begin{bmatrix} \Delta R(\lambda)_1 \\ \Delta R(\lambda)_2 \\ \vdots \\ \Delta R(\lambda)_m \end{bmatrix}$$

$$C = J \cdot R$$

where R is a spectral reflectance difference vector containing the spectral reflectance differences $\Delta R(\lambda)$, C is a correction vector containing the calculated cyan, magenta and yellow corrections ΔCc, ΔCm and ΔCy respectively measured through their primary color filters, and J' is a 3×m "correction" matrix relating the two vectors where m is the number of wavelength intervals.

31. The method of claim 30, and wherein the correction matrix is established on-line, throughout a press run, on a color zone by color zone basis.

32. The method of claim 30, and wherein the estimated parameters or the correction matrix are updated throughout a press run.

33. The method of claim 2, and wherein the printed sheet includes a plurality of printing zones, and wherein the step of controlling ink flow to the printing press comprises controlling ink flow on a zone by zone basis from measurements on a test area within the specific zone for which the ink flow is being corrected.

34. A method of controlling color on a printed sheet at a printing press, the method comprising:
measuring spectral reflectance values of a test area formed on the printed sheet;
converting the measured spectral reflectance values to corresponding test area colorimetric coordinates;
comparing the test area colorimetric coordinates to target colorimetric coordinates to determine color parameter difference values;
determining whether the color parameter difference values are within a tolerance;
if the color parameter difference values are not within the tolerance, comparing the measured spectral reflectance values to the target spectral reflectance values to determine spectral reflectance difference values;
converting the spectral reflectance difference values directly to correction values; and
controlling the ink flow to the printing press using the correction values.

35. The method of claim 34, and wherein the converting step comprises utilizing a linear equation to convert the spectral reflectance difference values to the correction value.

36. The method of claim 35, and wherein the converting step comprises dynamically determining and applying a correction matrix to the linear equation to produce the correction value.

37. The method of claim 36, and wherein elements of the correction matrix are determined using the method of least-squares.

38. The method of claim 34, and wherein the printed sheet has an image printed thereon, and the test area is within the image.

39. The method of claim 34, and wherein the printed sheet has an image printed thereon, and the test area is outside the image.

40. The method of claim 39, and wherein the test area comprises a color bar.

41. The method of claim 34, and wherein the printed sheet has an image printed thereon, and the test area includes a first area that is within the image and a second area that is outside the image.

42. The method of claim 41, and wherein the second area comprises a color bar.

43. The method of claim 34, and wherein the spectral reflectance difference values are converted directly to solid ink density correction values.

44. The method of claim 34, and wherein the spectral reflectance difference values are converted directly to ink layer thickness correction values.

45. The method of claim 34, and wherein the test area comprises a color bar having test swatches that include solids.

46. The method of claim 45, and wherein the solids include a solid of a special color ink.

47. The method of claim 34, and wherein the test area comprises a color bar having test swatches that include halftone tints.

48. The method of claim 34, and wherein the test area comprises a color bar having test swatches that include overprint combinations of the printing inks.

49. The method of claim 34, and wherein the test area comprises a color bar having alternating test swatches of three color neutral and black halftone tints.

50. The method of claim 34, and wherein the test area comprises first and second bars, the first color bar being entirely composed of a three-color neutral halftone tint, the second color bar having a black halftone tint.

51. The method of claims 34, and wherein the step of measuring is performed utilizing a spectrophotometer.

52. The method of claim 51, and wherein the spectrophotometer uses a spectral grating and an array of sensors with computer analysis.

53. The method of claim 51, and wherein the spectrophotometer generates on output that is a set of spectral reflectance values that describe the relative light reflecting characteristics of the test area over the visible spectrum at a predefined constant width wavelength interval.

54. The method of claim 53, and wherein the spectral reflectance values are obtained by calculating a spectral reflectance factor, wavelength by wavelength, across the visible spectrum.

55. The method of claim 51, and wherein the spectral reflectance values are converted to both colorimetric and densitometric representations.

56. The method of claim 55, and wherein the densitometric representations are calculated from spectral reflectance values according to ANSI/ISO standard responses and methods.

57. The method of claim 34, and wherein the measured spectral reflectance values are converted to colorimetric coordinates via CIE standard spectral curves or any linear combination of the CIE standard spectral curves.

58. The method of claim 34, and wherein the measured spectral reflectance values are converted to colorimetric coordinates according to one of the CIE recommended color spaces.

59. The method of claim 34, and wherein the target values are manually set by a printing press operator.

60. The method of claim 34, and wherein the target values are obtained from a "Colo r OK" sheet.

61. The method of claim 34, and wherein the target values are obtained from pre-press systems.

62. The method of claim 34, and wherein the step of converting the spectral reflectance difference values directly to correction values comprises using a linear matrix equation.

63. The method of claim 62, and wherein the linear matrix equation comprises:

$$\begin{bmatrix} \Delta C_C \\ \Delta C_M \\ \Delta C_Y \end{bmatrix} = \begin{bmatrix} a_{11} & a_{12} & a_{13} & \ldots & \ldots & a_{1m} \\ a_{21} & a_{22} & a_{23} & \ldots & \ldots & a_{2m} \\ a_{31} & a_{32} & a_{33} & \ldots & \ldots & a_{3m} \end{bmatrix} \begin{bmatrix} \Delta R(\lambda)_1 \\ \Delta R(\lambda)_2 \\ \vdots \\ \Delta R(\lambda)_m \end{bmatrix}$$

$$C = J' \cdot R$$

where R is a spectral reflectance difference vector containing the spectral reflectance differences ΔR(80), C is a correction vector containing the calculated cyan, magenta and yellow corrections ΔCc, ΔCm and ΔCy respectively measured through their primary color filters, and J' is a 3×m "correction" matrix relating the two vectors where m is the number of wavelength intervals.

64. The method of claim 63, and wherein the correction matrix is established on-line, throughout a press run, on a color zone by color zone basis.

65. The method of claim 63, and wherein the estimated parameters or the correction matrix are updated throughout a press run.

66. The method of claim 34, and wherein the printed sheet includes a plurality of printing zones, and wherein the step of controlling ink flow to the printing press comprises controlling ink flow on a zone by zone basis from measurements on a test area within the specific zone for which the ink flow is being corrected.

* * * * *

UNITED STATES PATENT AND TRADEMARK OFFICE
CERTIFICATE OF CORRECTION

PATENT NO. : 6,564,714 B2 Page 1 of 1
DATED : May 20, 2003
INVENTOR(S) : David Brydges and Erik Tobiason It is certified that error appears in the above-identified patent and that said Letters Patent is hereby corrected as shown below:

<u>Column 10,</u>
Line 65, change "80" to -- $\lambda$ --.

Signed and Sealed this

Ninth Day of September, 2003

JAMES E. ROGAN
*Director of the United States Patent and Trademark Office*